United States Patent
Heminger

Patent Number: 5,807,051
Date of Patent: Sep. 15, 1998

[54] DIELECTRIC ADHESIVE INSERT ANCHOR

[75] Inventor: David V. Heminger, Tulsa, Okla.

[73] Assignee: United Industries Corporation, Tulsa, Okla.

[21] Appl. No.: 771,942

[22] Filed: Dec. 23, 1996

Related U.S. Application Data

[60] Provisional application No. 60/009,714 Dec. 27, 1995, and 60/003,925 Sep. 18, 1995.

[63] Continuation-in-part of Ser. No. 717,528, Sep. 17, 1996.

[51] Int. Cl.⁶ ........................................ F16B 39/02
[52] U.S. Cl. ........................................ 411/82; 411/903
[58] Field of Search ........................ 411/901, 902, 411/903, 82, 258

[56] References Cited

U.S. PATENT DOCUMENTS

| | | | |
|---|---|---|---|
| 483,806 | 10/1892 | Hull | 411/902 |
| 1,674,258 | 6/1928 | Obergfell | 411/902 |
| 2,930,199 | 3/1960 | Jarund | 411/82 |
| 4,063,582 | 12/1977 | Fischer . | |
| 4,149,350 | 4/1979 | Fischer et al. . | |
| 4,652,193 | 3/1987 | Hibbs | 411/82 |
| 4,729,705 | 3/1988 | Higgins | 411/82 |
| 4,836,729 | 6/1989 | Bisping et al. | 411/82 |
| 4,840,524 | 6/1989 | Bisping et al. | 411/82 |
| 5,049,015 | 9/1991 | Sawaide | 411/82 |
| 5,263,804 | 11/1993 | Ernst et al. | 411/82 |
| 5,344,268 | 9/1994 | Fischer | 411/82 |
| 5,562,377 | 10/1996 | Giannuzzi | 411/82 |
| 5,568,711 | 10/1996 | Popp | 411/82 |

Primary Examiner—Flemming Saether
Attorney, Agent, or Firm—Scott R. Zingerman; Frank J. Catalano

[57] ABSTRACT

An adhesive insert anchor including an anchor body and a screw member for insertion into a drilled hole in a substrate containing an adhesive. The anchor body further including an integral friction segment and an adhesion segment. The friction segment includes an internally threaded cavity in which to receive the screw member and a knurled portion. The adhesion segment includes a cylindrical section and a plurality of saucer-shaped buttons positioned along its length ending with a terminal button. The buttons on the adhesion segment provide greater surface area for contact between the adhesive and the anchor. The friction segment has an external diameter substantially the same as the diameter of the hole drilled in the substrate, thereby providing a friction fit between the anchor body and the walls of the substrate hole. The external diameter of the adhesion segment is smaller than the external diameter of the friction segment so that when the anchor body is inserted into the hole in the substrate, there is space between the adhesion segment and the walls of the hole which is completely filled by adhesive so as to securely bond the anchor body with the substrate. The friction fit of the friction segment maintains the adhesion segment of the anchor body a proper distance from the bottom of the substrate hole and provides for light-duty loading of the anchor while the adhesive cures. Upon installation, the adhesion segment is twisted into the hole, thereby agitating the adhesive which disrupts the substrate dust remaining on the walls of the hole. This allows proper adhesion between the adhesive and the concrete. With the addition of a sleeve the anchor can be used in overhead applications. An alternate embodiment includes the addition of an insulator fitted to the anchor body to form the friction segment. The insulator being electrically non-conductive and the adhesive being electrically non-conductive to form a dielectric adhesive insert anchor.

23 Claims, 8 Drawing Sheets

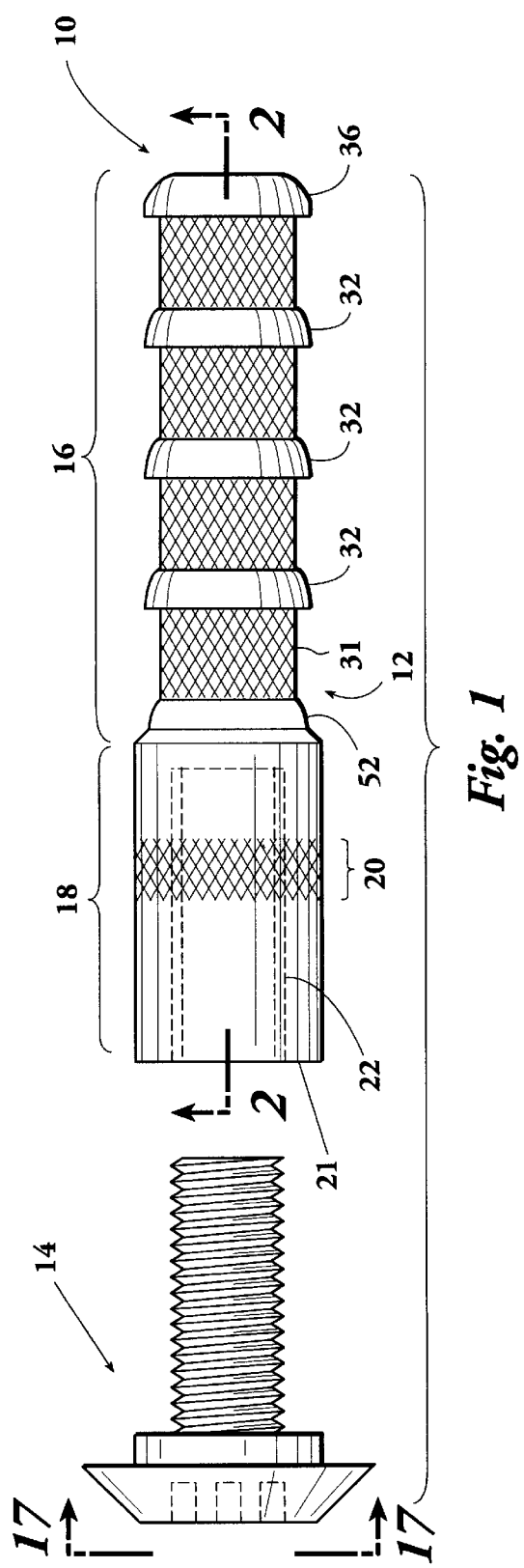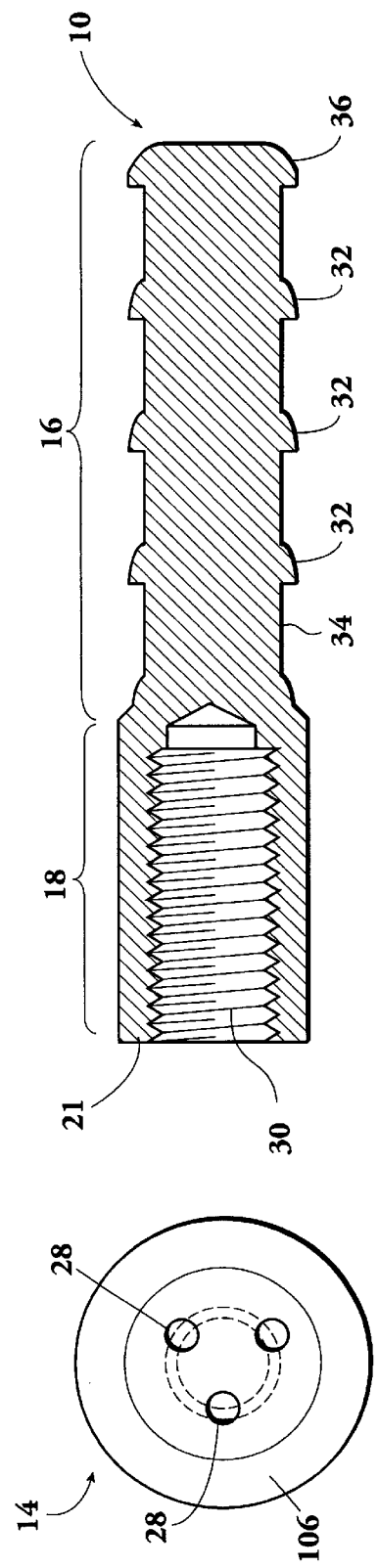

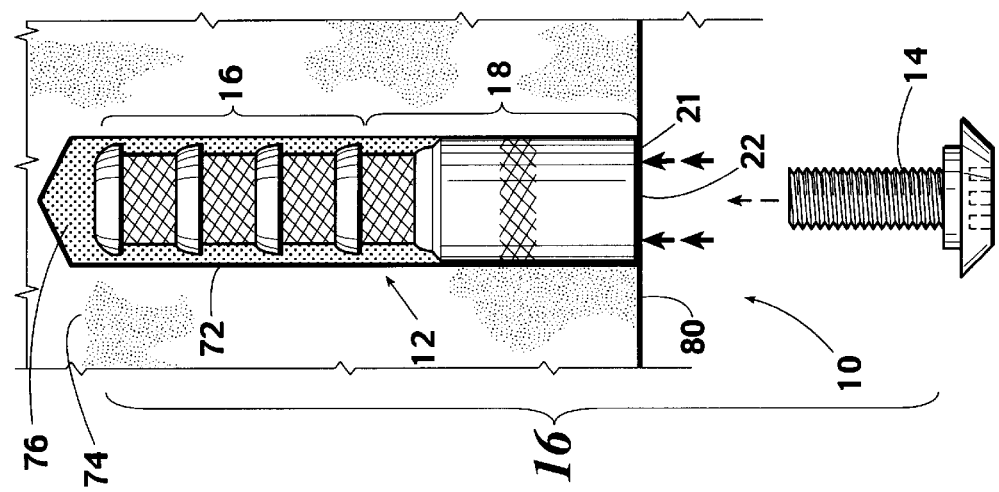
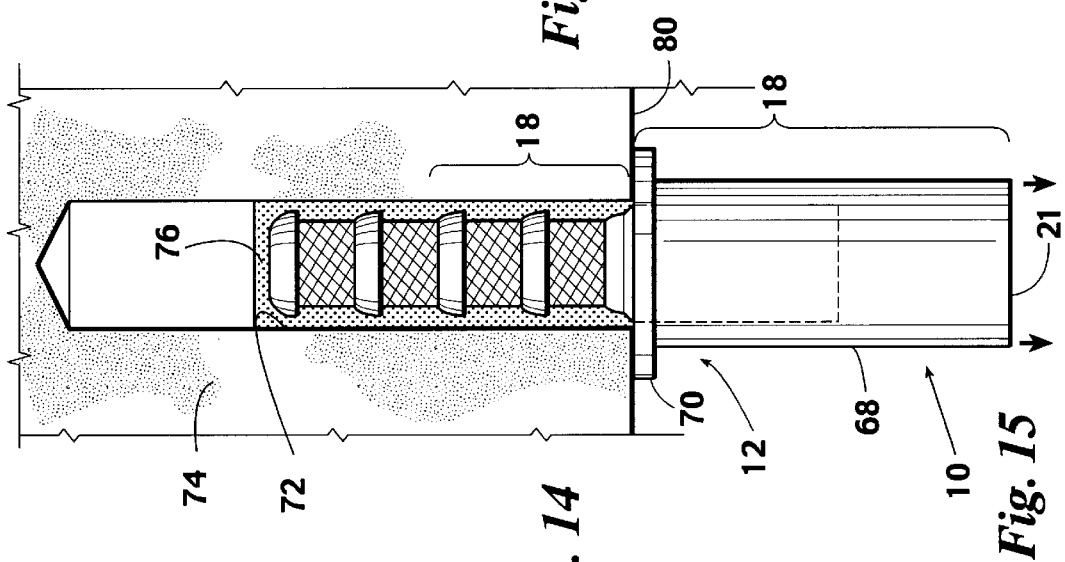
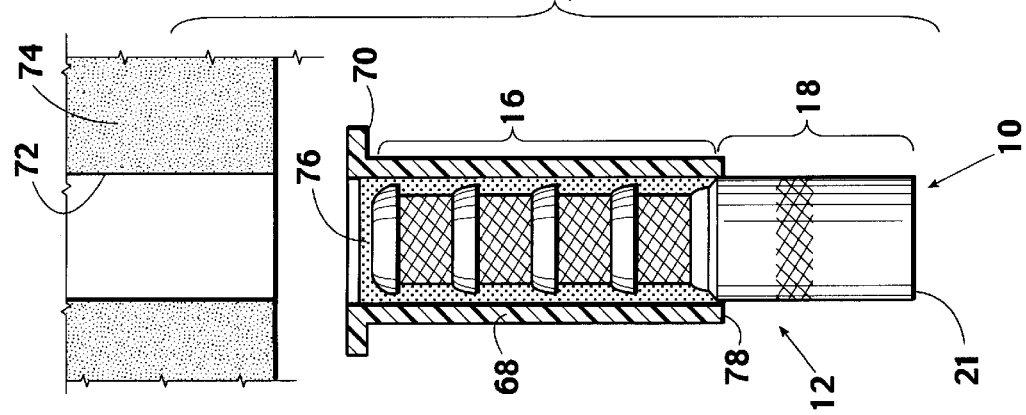

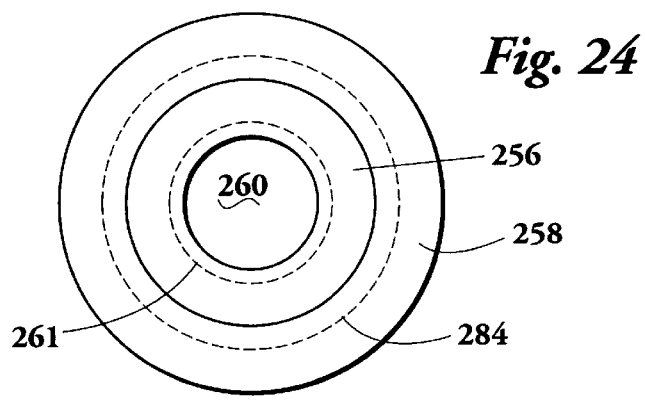
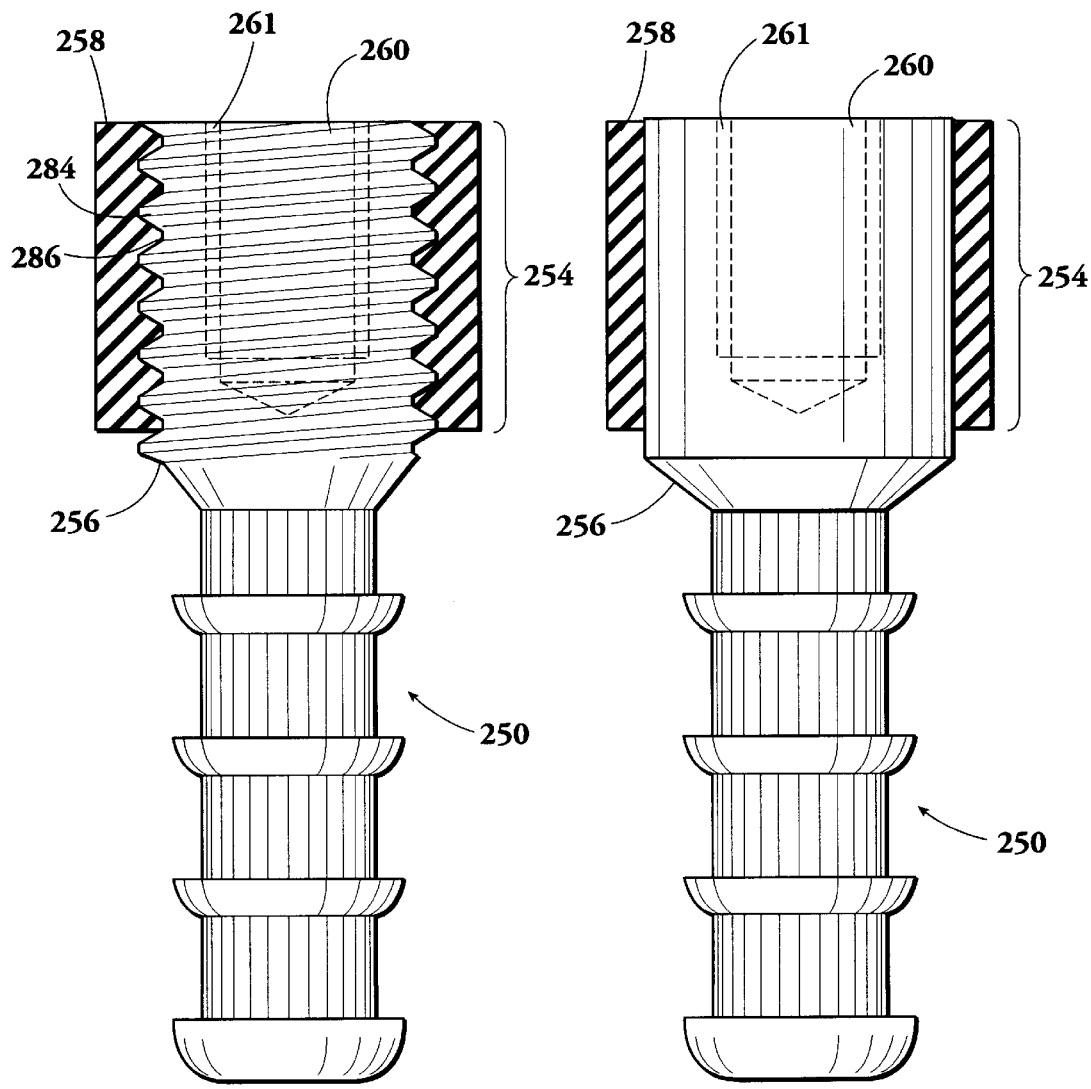
Fig. 24
Fig. 23
Fig. 25

DIELECTRIC ADHESIVE INSERT ANCHOR

This application claims the benefit of the following:
U.S. Provisional Application Ser. No. 60/009,714, filed Dec. 27, 1995.

This application is a continuation-in-part of co-pending application, Ser. No. 08/717,528, filed Sep. 17, 1996, which claims the benefit of the following U.S. Provisional Application Ser. No. 60/003,925, filed Sep. 18, 1995.

BACKGROUND OF THE INVENTION

1. Field of the Invention

The present invention relates to the combination of a mechanical anchor disposed in a hole in a substrate and an adhesive to bond the anchor to the substrate. The present invention further relates to a combination mechanical/adhesive anchor which is electrically insulated from the substrate.

2. Description of the Prior Art

The use of mechanical anchors disposed in a substrate and adhesives used to bond the anchor to the substrate are known in the art. These anchors are generally cylindrical in shape and include some type of means for securing an object to the substrate. Typically, a hole is drilled in the substrate, cleaned, and an amount of adhesive, such as epoxy, is inserted into the hole. The anchor is then inserted into the hole in contact with the adhesive, and the adhesive allowed to cure prior to placing the anchor under a load. The holding values of the anchors of the prior art are derived from the bond of the adhesive between the anchor and the substrate. This requires that the adhesive be allowed to cure prior to placing the anchor under a load. In addition, when the anchors of the prior art are installed, the adhesive has the potential of being displaced by the anchor and leaking around its external diameter which must be wiped away prior to loading. This may be an added problem if the anchor is configured with an internal cavity capable of receiving a threaded member. The internal cavity may become filled with adhesive, thereby preventing proper installation of the threaded member. A further problem with prior art designs is that the anchor is of a smaller diameter than the hole in the substrate and difficult to maintain in axial alignment with the hole. Difficulty is also encountered when attempting to install the anchor at a predetermined depth. Attempts at overcoming this problem include additional apparatus which require added skill in installation and additional cost to the anchor.

Anchors using adhesive such as epoxy alone to retain them in the substrate experience a phenomena known as "long term creep" when subject to elevated temperatures and/or long term loading conditions wherein the epoxy turns into a gel-like state and the anchor is pulled out of the hole very slowly over time.

A problem often encountered in the industry when epoxy adhesive is used is the presence of voids when the epoxy is dispensed into the hole. These voids often remain when the epoxy cures and reduces the holding value of the anchor.

Another problem is the potential failure of the components of the epoxy (typically two, an epoxy and an activator) to mix completely before being dispensed into the hole. An attempt to solve the mixing problem is the addition of static mixing attachments to the epoxy tubes without any modification to the anchor itself. Such solutions have not been completely successful.

It is also known in the industry that if the epoxy cures with a high cross-link density, the epoxy will provide a stronger bond, and the holding values for the anchoring system will be significantly higher. No current anchoring systems provide for the application of pressure to the epoxy during the curing period which is understood to increase the cross-link density of the final polymer.

Many situations require the use of an anchor which has dielectric properties or is electrically insulated. For example, dielectric anchors are used to fasten railroad ties to a concrete substrate in the construction of railway tunnels for subway systems. In such applications, a large amount of electrical current flows through the tunnel system to propel the train or subway. Current of this magnitude could destroy the anchor if conducted through it, such as by direct contact with the means for transmitting current through the railway or subway tunnel system.

Furthermore, railway and subway tunnel systems are frequently constructed under bodies of water or underground where water or moisture is present. Since water conducts electric current, the need for a dielectric anchor is evident. This need is especially acute where concrete is the substrate. Concrete is known for its porosity and, thereby, its ability to absorb and hold water. The concrete may essentially become an electrical conductor through the water contained within it.

Dielectric anchors presently known in the art are constructed of a non-conductive material, most commonly nylon which is partially sealed in a plastic or metal jacket. A bolt member is threaded into the nylon core to fasten an object, such as a railroad tie, to the anchor. Since nylon is non-conductive, the bolt member is electrically insulated from the substrate. A problem, however, is the fact that although the strength of nylon approximates the strength of steel, pound-for-pound, an anchor including a nylon body would not produce the same holding values as an anchor constructed of steel of approximately the same size. A need, therefore, exists for an anchor having a steel anchor body which is electrically insulated from the substrate.

An additional problem with known dielectric anchors is that they are cast-in-place. A cast-in-place anchor is installed as the substrate is poured by laying out a template which includes a plurality of anchors fastened to the object to be anchored and suspended into a form. Once the template is laid out, the substrate, most commonly concrete, is poured into the form and around the anchors. Once the substrate cures, the object is fastened to the substrate by the anchor. Problems associated with cast-in-place systems include the difficulty in positioning the template prior to pouring the substrate and particularly in aligning the anchors so as to be each properly suspended into the form. These problems are compounded by such factors as suspending the object being fastened (such as a railroad tie) above the form and the fact that the concrete should be poured at one time requiring several templates to be positioned prior to pouring.

Another significant problem associated with cast-in-place anchors is the difficulty in replacing an anchor if necessary. It is not practical to recast portions of substrate in order to recast an anchor.

A need, therefore, exists for an anchor which is electrically insulated from current which may be conducted through the substrate as well as electrically insulated from the object being anchored.

A further need exists for a dielectric anchor capable of being installed in a substrate after the substrate is cast.

A need also exists for a dielectric anchor which can be replaced or reset without recasting the substrate.

A need exists for a dielectric anchor having a higher pull-out strength than a cast-in-place anchor.

A need, additionally, exists for an adhesive insert anchor which minimizes the voids in the epoxy dispensed into the substrate hole.

Another need exists for an adhesive insert anchor which promotes additional mixing of the epoxy components in the hole during the installation process.

A need exists for an adhesive insert anchor which allows the epoxy to cure under pressure in the hole, producing improved holding values.

A need exists for an adhesive insert anchor having coactive holding capabilities producing significant holding values.

Additionally, a need exists for an adhesive insert anchor including an anchor body capable of being set to a predetermined depth.

A need also exists for an adhesive insert anchor which includes means for providing interim loading while the adhesive cures.

A further need exists for an adhesive insert anchor including means to prevent the leakage of adhesive around the anchor body during installation.

SUMMARY OF THE INVENTION

This invention is a novel adhesive insert, drop-in, anchor providing effective adhesion of the anchor to the substrate through the use of an adhesive material. The novel anchor is comprised of an anchor body and a screw member. The anchor body includes an internally threaded cavity in which to receive the screw member. The anchor body is a unitary piece defined by an upper friction segment and a lower adhesion segment. The external diameter of the friction segment is greater than the external diameter of the adhesion segment. The length and diameter of the anchor body, and thereby the depth and diameter of the hole in the substrate, as well as the length and diameter of the screw member, may be varied, depending upon the desired application, holding value required, concrete variability, and thickness of the object being anchored.

The adhesion segment of the anchor body is a unitary piece of material defined by a series of buttons. Each button is saucer shaped with a rounded contour facing the terminal end of the anchor body and a flat shelf facing the friction segment. The rounded contour facilitates the flow of adhesive around the buttons and up the length of the adhesion segment to ensure complete immersion of the adhesion segment in adhesive. The flat shelf resists the anchor body from being pulled out of the hole, once the adhesive has cured.

The adhesion segment is substantially cylindrical between the buttons and is knurled to increase the surface area in contact with the adhesive. The number of buttons used on the adhesion segment depends upon the length of the anchor.

The friction segment has an external diameter substantially the same as the diameter of the hole drilled in the substrate into which the anchor body is inserted. The terminal end of the adhesion segment is inserted first. The friction segment provides a friction fit between the anchor body and the walls of the substrate hole. The external diameter of the adhesion segment is smaller than the external diameter of the friction segment so that when the anchor body is inserted into the hole in the substrate, there is a space between the anchor and the walls of the hole which is completely filled by adhesive so as to securely bond the anchor body with the substrate. The external diameter of the friction segment includes a knurled portion in order to increase the friction fit between the anchor body and the walls of the substrate hole. The knurled portion also resists rotation of the anchor body within the substrate hole because upon insertion of the anchor body, the knurls scar the inside of the substrate hole.

Installation of the adhesive insert anchor of the present invention begins with drilling a hole in the substrate, such as concrete, masonry, rock, or the like, to a predetermined depth. The hole is then cleaned using compressed air and a brush. After cleaning, a generous amount of adhesive is inserted in the bottom of the hole. The anchor body is then twisted into the hole in order to agitate the adhesive in order to eliminate voids, thoroughly mix the components of the adhesive, and dislodge substrate (concrete) dust from the walls of the hole allowing the adhesive to attack the porosity of the substrate. The anchor body is twisted into the hole until the friction segment reaches the top of the concrete, the anchor body is then driven into the hole so that the adhesion segment displaces the adhesive entirely around the adhesion segment.

The friction fit of the friction segment with the walls of the hole prohibit the escape of adhesive around the anchor body which might otherwise fill the internally threaded cavity. The friction fit also places the adhesive under pressure which compresses voids and increases cross-link density in the cured adhesive. It also forces the adhesive into the porous substrate, most commonly concrete, thereby obtaining a stronger adhesive/substrate bond.

The friction fit of the friction segment maintains the adhesion segment of the anchor body a predetermined distance from the bottom of the substrate hole so that a substantial amount of adhesive fills that space. Secondly, the friction fit of the friction segment holds the anchor body in place during the curing time of the adhesive. Thirdly, the friction fit provides for light-duty loading of the anchor while the adhesive cures. In this way, a time saving feature is provided so that the screw member may be threaded into the internally threaded cavity while the adhesive is curing, and the anchor may provide light-duty loading in order to anchor an object during the curing time of the adhesive. Lastly, the friction fit retains the anchor body in the substrate in order to minimize or eliminate the problem of "long term creep" of the anchor body out of the adhesive.

The adhesive insert anchor of the present invention as described above provides independent coactive holding capabilities provided by the friction fit and the cured adhesive.

The screw member is removably threaded into the internally threaded cavity so that the object being anchored can be removed or replaced as desired. The screw member may be configured in many different ways such as a bolt, eyelet, or may be integral with the anchor body such as a threaded bolt or a permanent hold-down.

The adhesive insert anchor may be fitted with a sleeve so as to be used for overhead applications. The sleeve covers the adhesion segment and has an internal diameter so as to frictionally engage the friction segment. When secured to the friction segment, the sleeve acts as a cup into which adhesive is dispensed so as to fill the sleeve. Once the hole is prepared, the sleeve is placed over it and the friction segment twisted so as to push it into the sleeve. This forces the adhesion segment and the adhesive into the hole. Once the friction segment frictionally engages the hole, the anchor body is then driven into the hole. A mess free adhesive insert anchor is thereby provided for overhead use.

In an alternate embodiment, an electrically nonconductive insulator may be fitted to the anchor body to form the friction segment. This insulator, being electrically non-conductive, and being the only part of the anchor body which directly contacts the substrate, electrically insulates the anchor body from the substrate. If the adhesive, such as epoxy, is electrically non-conductive, a dielectric anchor adhesive insert anchor results.

The dielectric anchor of the present invention may be used in any application where metal comes in contact with the substrate, concrete, and high voltage is involved. This dielectric adhesive insert anchor is installed after the concrete is cast, thereby, eliminating the alignment problems associated with cast-in-place anchors. Furthermore, the present anchor is capable of being reset or replaced by drilling the old adhesive out of the concrete hole, cleaning the hole, and then installing a new anchor. The present anchor could also act as a replacement for existing dielectric cast-in-place anchors which have pulled loose from the substrate.

The insulator of the dielectric adhesive insert anchor may be fitted to the anchor body by placing threads on the friction segment of the anchor body and internally threading the insulator with threads which mate the threads of the anchor body. The insulator is then screwed onto the anchor body. The insulator may also be press fit onto the anchor body, thereby eliminating the threads. The insulator should be fit into the anchor body to prevent adhesive from escaping between the insulator and the anchor body.

An object of the present invention includes providing a dielectric adhesive insert anchor with superior holding values.

A further object of the present invention includes an adhesive insert anchor which is electrically insulated from current which may be conducted through the substrate as well as electrically insulated from the object being anchored.

A yet further object of the present invention includes a dielectric adhesive insert anchor capable of being installed after the substrate cures.

A still further object of the present invention includes a dielectric adhesive insert anchor having a higher pull-out strength than a cast-in-place anchor.

An additional object of the invention is to provide an adhesive insert anchor that minimizes voids in the adhesive and increases cross-linking density of the epoxy adhesive cured under pressure created and maintained by the friction fit of the friction segment.

Another object of the invention is to provide an adhesive insert anchor that is easy to install, achieves excellent holding values, resists vibration, resists environmental conditions, and may include a removable screw member to provide for fastening, removal, and then refastening.

It is a further object of this invention to provide an anchor with coactive holding potential derived both from the adhesive bond between the anchor body and the substrate and from the friction fit of the friction segment with the walls of the substrate.

An additional object of this invention is to provide an adhesive insert anchor which provides interim loading potential derived from the friction fit of the friction segment with the walls of the substrate while the adhesive cures.

A still further object of the invention is to provide an adhesive insert anchor that allows the anchor body to be maintained at a proper predetermined depth in the substrate hole during cure of the adhesive.

A yet further object of the invention is to provide an adhesive insert anchor having an adhesive segment including a substantial surface area to contact with the adhesive, yet configured so as to resist the occurrence of stress risers in the cured adhesive.

These and other objects will become more apparent from the following description taken in conjunction with the drawings.

BRIEF DESCRIPTION OF THE DRAWINGS

FIG. 1 is a side view of the adhesive insert anchor of the present invention.

FIG. 2 is a longitudinal cross-section of the anchor of FIG. 1 taken along line 2—2 of FIG. 1.

FIG. 14 is a side view of the adhesive insert anchor of the present invention including a sleeve and an adhesive for use in overhead applications.

FIG. 15 is a side view of the adhesive insert anchor of the present invention including a sleeve and an adhesive being inserted into a hole in a substrate in an overhead application.

FIG. 16 is a side view of the adhesive insert anchor of the present invention including a sleeve and an adhesive fully inserted into a hole in a substrate in an overhead application.

FIG. 17 is an end view of the bolt of FIG. 1 showing the tamper-proof sockets.

FIG. 23 is a partial cut-away side view of a dielectric adhesive insert anchor wherein the insulator is threaded onto the anchor body.

FIG. 24 is a top view of the dielectric adhesive insert anchor of FIG. 23.

FIG. 25 is a partial cut-away side view of a dielectric adhesive insert anchor wherein the insulator is press fit onto the anchor body.

DETAILED DESCRIPTION OF THE PREFERRED EMBODIMENT

Figure 3:
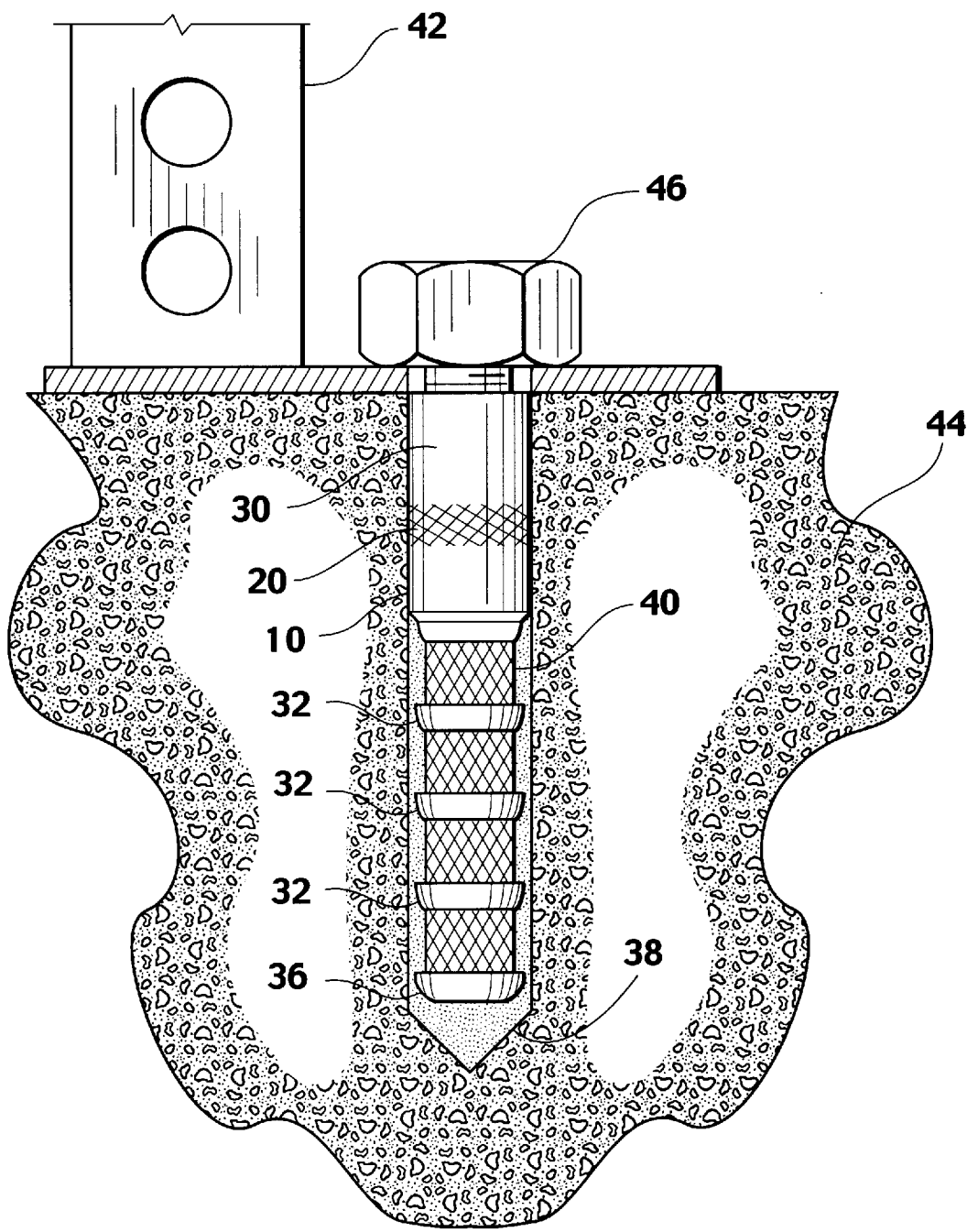
FIG. 3 is the anchor of FIG. 1 installed in a substrate with a bolt threaded in the cavity of the friction segment thereby anchoring a member to the substrate.

Attention is directed to FIG. 1 which shows the adhesive insert concrete anchor of the present invention 10 which includes an anchor body 12 and a screw member 14. Anchor body 12 is preferably constructed of carbon steel or stainless steel. Screw member 14 is preferably constructed of carbon steel or stainless steel. It is understood that other suitable materials could be substituted to construct anchor body 12 and screw member 14. Anchor body 12 includes an integral adhesion segment 16 and friction segment 18. Anchor body 12 is designed to be inserted into a hole predrilled into a substrate such as concrete with adhesion section 16 inserted first such that the top portion 21 of friction segment 18 is flush with the surface of the substrate.

Screw member 14 includes flathead 24, spacer 25, and threaded portion 26. In the preferred embodiment, flathead 24 includes a plurality of indentions 28 (described below) for receiving a tool used for threading screw member 14 into anchor body 12. Indentations 28 may be of any desired configuration in order to mate the tool. For example, indentations 28 may be configured with a slot to receive a flathead screwdriver, or perpendicular slots for receiving a phillips head screwdriver, or any other desired configuration.

Adhesion segment 16 includes a plurality of saucer shaped buttons 32 with an outer diameter greater than the outer diameter of the shaft of the adhesion segment 34. Buttons 32 are rounded, or saucer shaped, such that when the anchor is inserted into a substrate hole containing adhesive, the rounded portion facilitates the flow of adhesive around buttons 32 so that the entire adhesion segment 16 is submerged in adhesive. Buttons 32 include a flat shelf facing friction segment 18. As anchor 10 is inserted into a substrate hole containing adhesive, the flat shelves of buttons 32 provide greater surface area such that when the adhesive cures, buttons 32 provide resistance against the adhesive to maintain anchor 10 within the substrate hole, thereby contributing to the holding values of anchor 10.

A terminal button 36 is shaped substantially the same as buttons 32 with the exception that its bottom surface is rounded, forming the terminal end of anchor 10. This rounded bottom surface of terminal button 36: 1.) Allows adhesive to flow freely around adhesion segment 16 as adhesion segment 16 is inserted into a substrate hole containing adhesive; and 2.) Helps prevent stress risers from occurring in the cured adhesive around terminal button 36.

The number of buttons placed on adhesion segment 142 depends on the length of the anchor. The length and diameter of the anchor is dependent upon the specific application and holding values required. The outer diameters of buttons 32 and terminal button 36 may be equal in size or may decrease in size (not shown) with terminal button 36 having the greatest diameter and the button closest to friction segment 18 having the smallest diameter.

Figure 7:
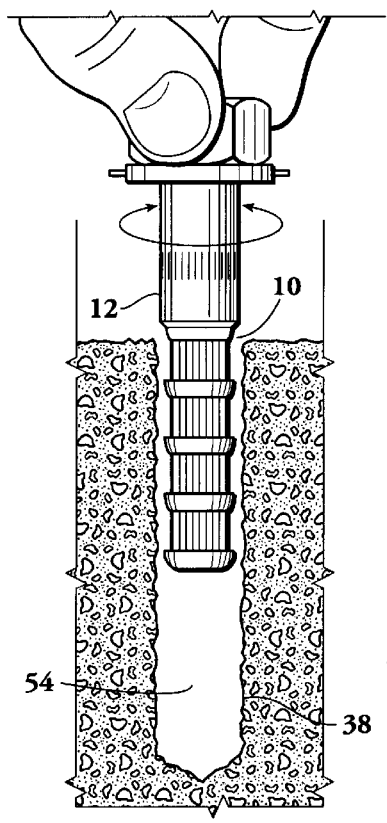
FIG. 7 is a cut-away partial side view of the hole of FIG. 6 wherein the adhesive insert anchor of the present invention is being twisted into the hole.
Figure 8:
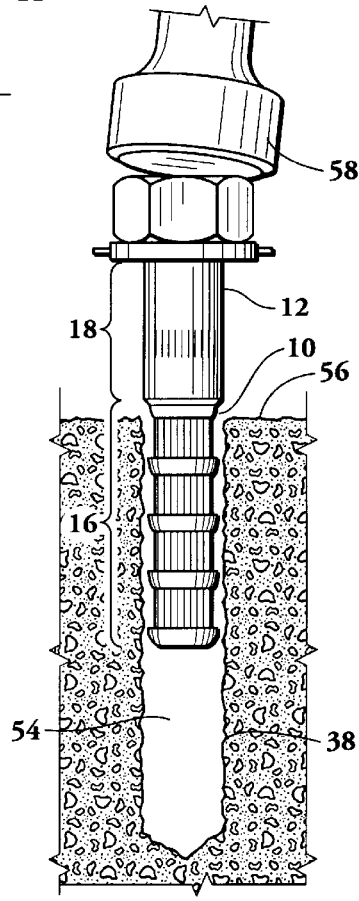
FIG. 8 is a cut-away partial side view of the hole of FIG. 7 wherein the adhesive insert anchor of the present invention is being driven into the hole.
Figure 9:
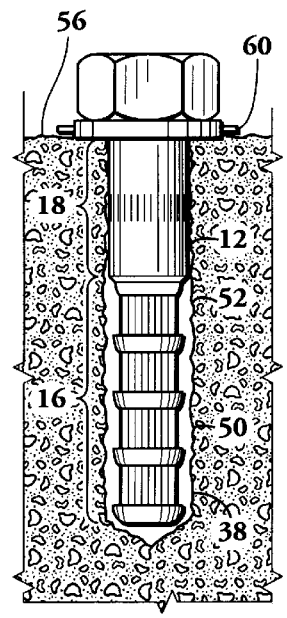
FIG. 9 is a cut-away side view of the hole of FIG. 8 with the adhesive insert anchor of the present invention fully installed.

Shaft 34 of adhesion segment 16 is knurled so as to increase the surface area of shaft 34. When adhesion segment 16 is inserted into a hole containing adhesive, the adhesive enters the crevices formed by the knurling and thereby forms a surface-to-surface bond between shaft 34 and the adhesive. These surface-to-surface bonds increase the holding value of anchor 10. The knurling could be in many suitable configurations. For example, the knurling shown in FIG. 1 is cross-hatched while the knurling shown in FIGS. 7–9 is vertical.

As can be seen from FIG. 2, buttons 32 as well as terminal button 36 are formed integrally with shaft 34 and friction segment 18 so that anchor 10 is an integral unit containing cavity 30 therein.

Friction segment 18, FIG. 1, includes an internally threaded cavity 22 therein (shown in phantom) into which screw member 14 is threaded so that screw member 14 may anchor an object into anchor body 12 when anchor body 12 is fixed in a substrate. As can be seen in FIG. 2, a longitudinal cross-section of the anchor body of FIG. 1 taken along line 2—2 of FIG. 1, internally threaded cavity 22 is cut in friction segment 18 substantially the entire length of friction segment 18. The threads of internally threaded cavity 22 are cut to mate the threads of screw member 14 of FIG. 1 so that screw member 14 may be threaded inside internally threaded cavity 22. Screw member 14 can be threaded into internally threaded cavity 22 substantially the entire length of friction segment 18 of anchor body 12 in order to provide effective anchoring potential (holding values).

Referring again to FIG. 1, friction segment 18 is of a diameter substantially the same as the diameter of the hole drilled in the substrate so that when anchor body 12 is inserted into the hole drilled in the substrate, friction segment 18 will friction fit into the hole. The friction fit of friction segment 18 to the walls of the hole in the substrate allow anchor body 12 to be inserted and maintained at a depth in the hole in the substrate so that terminal button 36 of adhesion segment 16 is suspended a predetermined distance from the bottom of the hole drilled in the substrate.

Friction segment 18 includes a knurled segment 20 cut in its circumference. Knurled segment 20 as shown in FIG. 1 is cross hatched; however, it could be a series of parallel grooves cut in the circumference of friction segment 18 or any knurling pattern known in the industry. Knurled segment 20 adds to the frictional forces when anchor body 12 is inserted into the hole drilled in the substrate by scarring the walls of the hole. Additionally, knurled segment 20 resists rotation of anchor body 12 in the hole while screw member 14 is threaded into internally threaded cavity 22.

Adhesion segment 16 includes an irregular external diameter; however, the external diameter of adhesion segment 16 is smaller than the external diameter of friction segment 18, even at its points of greatest external diameter. Adhesion segment 16 does not contact the walls of the hole drilled in the substrate. A taper 52 reduces the external diameter of anchor body 12 from friction segment 18 to adhesion segment 16.

As is described above, adhesive insert anchor 10 provides independent coactive holding capabilities derived from: 1.) the friction fit of friction segment 18 and the substrate, and 2.) the cured adhesive bonding anchor 10 to the substrate. These coactive holding capabilities are found in all of the embodiments discussed herein.

Figure 4:
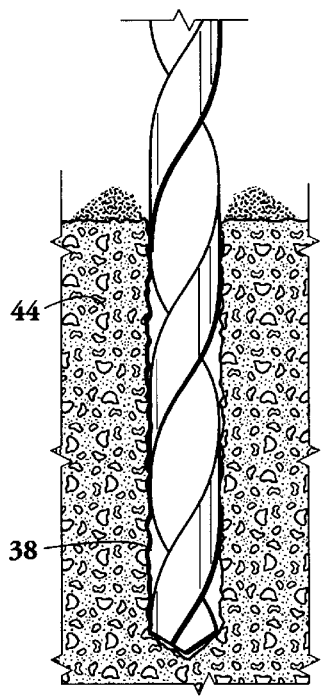
FIG. 4 is a cut-away side view of a hole being drilled in a substrate.

Referring to FIG. 4, installation of the adhesive insert anchor begins with drilling a hole 38 in the substrate 44 to a predetermined depth. Substrate 44 may be any material, such as masonry or rock, but is most commonly concrete. The depth of hole 38 will be greater than the length of anchor body 12 to accommodate a generous amount of adhesive.

Figure 5:
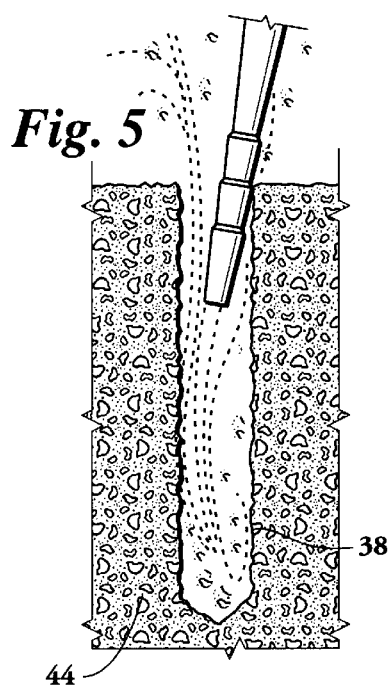
FIG. 5 is a cut-away side view of the hole of FIG. 4 being cleaned of debris.
Figure 6:
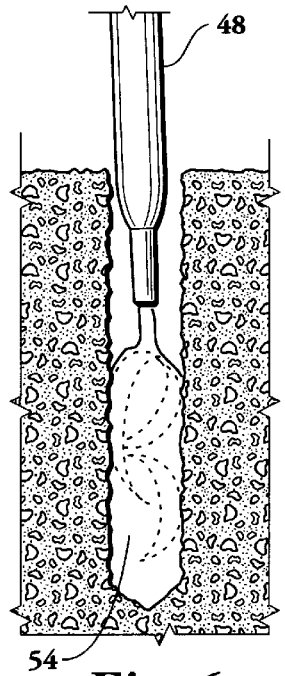
FIG. 6 is a cut-away side view of the cleaned hole of FIG. 5 wherein adhesive is being inserted using a static mixer.

Hole 38 is then cleaned, FIG. 5, with compressed air and a brush to remove any loose material in hole 38 as a result of drilling. This allows the adhesive to bond properly with the walls of hole 38. The presence of concrete dust resulting from drilling could affect the adhesion between the adhesive and walls of concrete hole 38. Concrete dust acts as a lubricant in the concrete hole, preventing the adhesive from entering the porosity of the concrete hole. After hole 38 is cleaned, an adhesive is added into hole 38, FIG. 6. Any adhesive suitable for the application can be used; however, an epoxy available from COVERT OPERATIONS® is highly suitable for this application. The epoxy is mixed with a small static mixing element 48 upon installation. The proper amount of adhesive should be added to hole 38 so that when anchor body 12 is inserted into hole 38, adhesive will fill the entire space 50, FIG. 9, between adhesion segment 16 and the walls of hole 38, all the way to the top of taper 52. This allows a strong bond between concrete 44 and anchor body 12.

Once the proper amount of adhesive 54 is added, anchor body 12, FIG. 7, is twisted into hole 38 to agitate adhesive 54. Twisting of anchor body 12 provides effective whetting of hole 38 by concrete dust on the walls of hole 38. This increases the ability of adhesive 54 to attack the porosity of the concrete, providing a better adhesive bond. Twisting of anchor 10 into hole 38 also functions to eliminate or minimize voids in adhesive 54 which may be present such as by air being trapped when the adhesive 54 inserted. Additionally, twisting anchor 10 agitates adhesive 54 in order to ensure thorough mixing such as when the adhesive is epoxy, a two-part mixture, generally of an epoxy and an activator. Anchor 10 is twisted into hole 38 until friction segment 18, FIG. 8, reaches the surface 56 of concrete 44. Then, anchor 10 is driven into hole 38 with a hammer 58 or similar instrument. Driving anchor 10 into hole 38 displaces adhesive 54 in hole 38 which fills the entire space 50 between adhesion segment 16 and hole 38.

It is known in the industry that when an adhesive such as epoxy is used, that the greater its cross-link density, the stronger the adhesive bond. It is also known that cross-link density can be increased by either an increase in cure temperature or an increase in cure pressure. When anchor 10 is driven into hole 38, adhesive segment 16 is forced into adhesive (epoxy) 54. A substantial amount of adhesive 54 is added to hole 38 such that once adhesive segment 16 is driven into it, adhesive 54 is placed under pressure. The friction fit between friction segment 18 and hole 38 maintains this pressurized state. The cross-link density of the epoxy is thereby increased. This pressurized state further forces adhesive 54 into the substrate, concrete 44 allowing it to attack the porosity of the concrete 44 as well as any voids which are frequently present. This results in a strong adhesive bond with anchor 10 as well as a strong bond between adhesive 54 and concrete 44.

Anchor body 12 is driven into hole 38 so that its upper surface 60 is flush with the surface 56 of concrete 44. The friction fit between friction segment 18 of anchor body 12 and the walls of concrete hole 38 maintains adhesion segment 16 a proper predetermined distance above the bottom of hole 38 so that a substantial amount of adhesive fills space 50. In addition to maintaining adhesion segment 16 the proper distance from the bottom of hole 38, the friction fit between friction segment 18 and the walls of hole 38 provides light-duty interim loading until the adhesive cures in space 50 around adhesion segment 16. This light-duty interim loading provides a time savings in that screw member 14 may be inserted through the object to be anchored (42) and threaded into internally threaded cavity 22 and thereby anchored by the friction fit of friction segments 18 with the walls of hole 38 while the adhesive around adhesive segment 16 is curing. Quick installation derived from this coactive holding capability is thereby provided. Knurled portion 20 (of FIG. 1) resists the rotation of anchor body 12 within hole 38 when screw member 14 is threaded into cavity 22 before the adhesive is cured.

A tight friction fit between friction segment 18 and the walls of hole 38 also prevents adhesive from being displaced around anchor body 12 so that it leaks around top surface 21 and into cavity 22. Such adhesive leaks are undesirable because they must be cleaned away, and it is undesirable for screw member 14 to be bonded or prevented from being entirely threaded by adhesive inside cavity 22. Additionally, leakage prevention provided by the friction fit prevents the object being anchored from being adhesively bonded to concrete 44.

Depending on the thickness of the object to be anchored (42), a spacer 25 (FIG. 1) may be added to screw member 14 between flathead 24 and the concrete. Spacer 25 is an integral part of screw member 14.

The length and diameter of anchor body 12, and thereby the depth and diameter of hole 38, as well as the length and diameter of screw member 14 may be varied, depending upon the desired application, holding value required, and thickness of the object being anchored.

Figure 10:
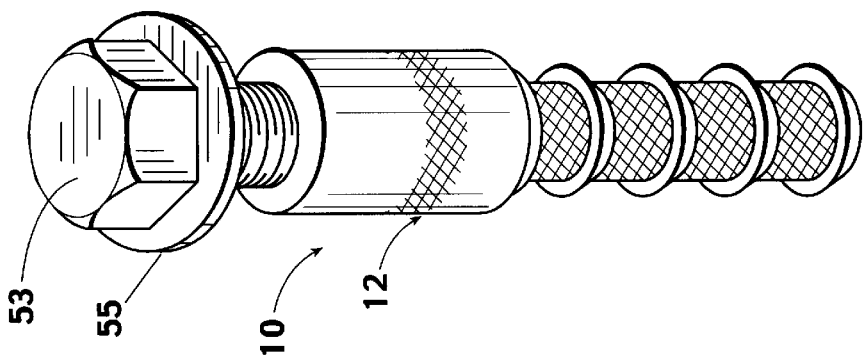
FIG. 10 is a side view of the adhesive insert anchor of the present invention configured with a bolt-in screw member and washer.

Screw member 14 of FIG. 1, which could be configured in a variety of difference ways or replaced with a variety of head portion configurations, may be integrated with anchor body 12, thereby eliminating internally threaded cavity 22. FIG. 10 depicts the adhesive insert anchor 10 wherein screw member 14 is replaced with a threaded bolt 53 and washer 55. Bolt 53 has threads mating the threads of internal threaded cavity 22 (not shown) so that bolt 53 may be threaded into the internal threaded cavity of anchor body 12.

Figure 11:
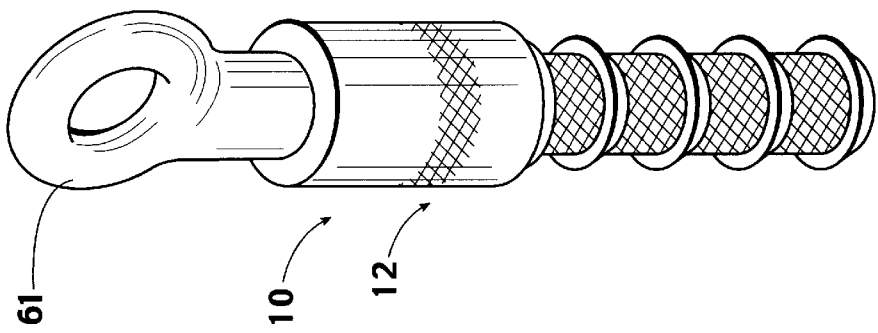
FIG. 11 is a side view of the adhesive insert anchor of the present invention configured with an eyelet fastener head portion.

FIG. 11 depicts adhesive insert anchor 10 wherein screw member 14 (FIG. 1) is replaced with an eyelet fastener 61. Eyelet fastener 61 may either include threads which mate the threads of internally threaded cavity 22 (not shown) so that eyelet fastener 61 can be threaded into anchor body 12, or eyelet fastener 61 may be an integral part of anchor body 12 and thereby fixed thereto (FIG. 11).

Figure 12:
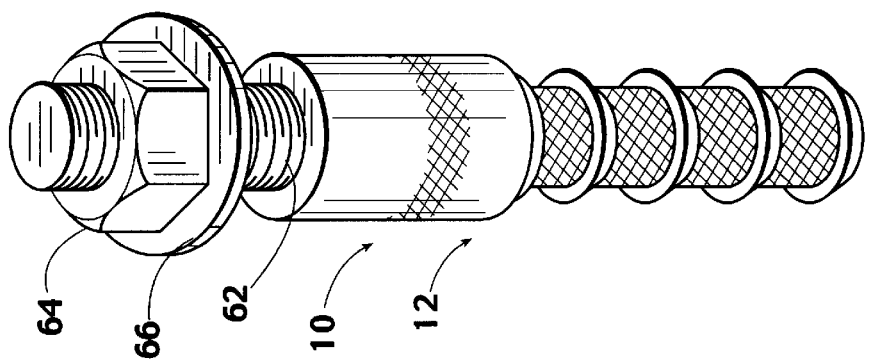
FIG. 12 is a side view of the adhesive insert anchor of the present invention configured with an integral male threaded rod, nut and washer.

FIG. 12 depicts adhesive insert anchor 10 wherein the screw member 14 and internally threaded cavity 22 (of FIG. 1) have been replaced with a male thread rod 62. Male thread rod 62 is an integral part fixed to anchor body 12 and extending upwardly therefrom. Male threaded rod 62 is threaded so as to receive a threaded nut 64 and washer 66.

Figure 13:
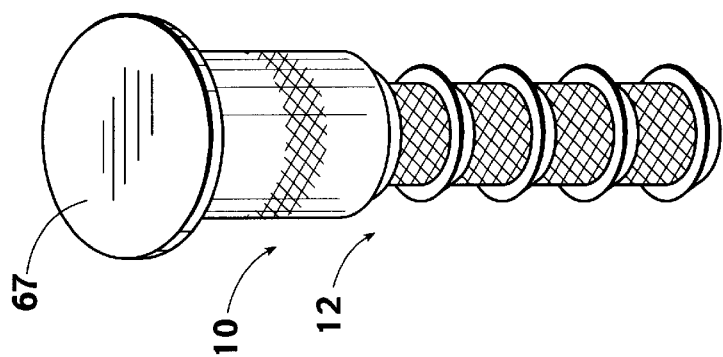
FIG. 13 is a side view of the adhesive insert anchor of the present invention configured with an integral hold-down portion.

FIG. 13 shows adhesive insert anchor 10 wherein screw member 14 and internally threaded cavity 22 (of FIG. 1) have been replaced by a permanent hold-down head portion 67. Permanent hold-down head portion 67 is an integral part of anchor body 12 and fixed thereto. The anchor of FIG. 13 would be used where it is desired to have an anchor with a large head portion surface area in which to permanently anchor an object.

The head portion configurations shown in FIGS. 4–7 are for exemplification purposes only, and are not all-inclusive. Adhesive insert anchor 10 could be configured with other head portions, such as a tamper-proof bolt, not depicted herein.

Referring to FIG. 14, adhesive insert anchor 10 may be employed for wall or overhead applications. In an overhead application, anchor body 12 is fitted with a cylindrical sleeve 68. Sleeve 68 may be constructed of plastic or any other suitable material. Sleeve 68 is removably fitted on anchor body 12 so that it completely covers adhesion segment 16 and has an internal diameter which is substantially the same as the external diameter of friction segment 18 and removably fixes thereon. Sleeve 68 includes an annular flange 70 which is substantially larger than the diameter of friction segment 18.

Installation of adhesive insert anchor 10 in an overhead application is accomplished by drilling a hole 72 in substrate 74 to a predetermined depth. The depth of hole 72 is again greater than the length of anchor body 12 so as to accommodate a generous amount of adhesive. The diameter of hole 72 is substantially the same as the diameter of friction segment 18. The hole is then cleaned with compressed air and a nylon brush to remove any loose material in hole 72 as a result of drilling. This allows the adhesive to bond properly with the walls of hole 72. After hole 72 is properly cleaned, sleeve 68 is fixed on anchor body 12 so that adhesion segment 16 is completely covered. Sleeve 68 is then filled with an adhesive such as epoxy 76 to flange 70 so that adhesion segment 16 is completely immersed in epoxy. Adhesive anchor 10 is then located over hole 72, and anchor body 12 is twisted by gripping friction segment 18 and pushing adhesion segment 18 into hole 72 until friction segment 18 engages hole 72 (FIG. 15). Surface 21 is struck with a hammer or similar instrument until surface 21 is flush with surface 78 of sleeve 68. This configuration is shown in FIG. 15 wherein anchor body 12 has been twisted into hole 72 in substrate 74 so that adhesion segment 16 is completely inserted into hole 72. Since annular flange 70 is of a greater diameter than the diameter of hole 72, annular flange 70 prevents sleeve 68 from entering hole 72. Due to the fact that the internal diameter of sleeve 68 is substantially the same as the external diameter of friction segment 18, pushing friction segment 18 through sleeve 68 forces adhesive 76 into hole 72. Since the external diameter of friction segment 18 is substantially the same as the diameter of hole 72, as friction segment 18 extends into hole 72, it prevents adhesive 76 from leaking from hole 72 such as by gravity. Sleeve 68 is then pulled off of friction segment 18 and discarded. Anchor body 12 is then driven the rest of the way into hole 72 so that surface 20 is flush with the surface 80 of substrate 74.

FIG. 16 depicts anchor body 12 completely inserted into hole 72 in substrate 74 so that surface 21 is flush with surface 80 of substrate 74. When anchor body 12 is completely inserted, friction segment 18 pushes adhesive 76 to the end of hole 72 so that adhesive 76 completely surrounds adhesion segment 16, thereby providing a bond between adhesion segment 16 and substrate 74. Friction segment 18 prevents adhesive 76 from leaking out of hole 72 before curing. Friction segment 18 also provides light-duty interim loading of anchor 10 when screw member 14 is threaded into internally threaded cavity 22 (shown in phantom). Upon curing of epoxy 76, anchor body 12 is held in hole 72 both by epoxy 76 bonding adhesion segment 18 to substrate 74 and by friction segment 18 being friction fit with the walls of hole 72.

FIG. 17 depicts screw member 14 configured with a tamper-proof head 106. In certain applications it is necessary to install a screw member having a tamper-proof head in order to prevent unauthorized removal of the screw member and subsequently, the object being anchored. Screw member 14 includes a tamper-proof head 106 containing tamper-proof sockets 28. Tamper-proof sockets 28 are configured in such a manner to mate a setting tool (108 of FIG. 19). In order to install or remove tamper-proof screw member 14, one must have a setting tool 108 that mates screw member 14.

Figure 18:
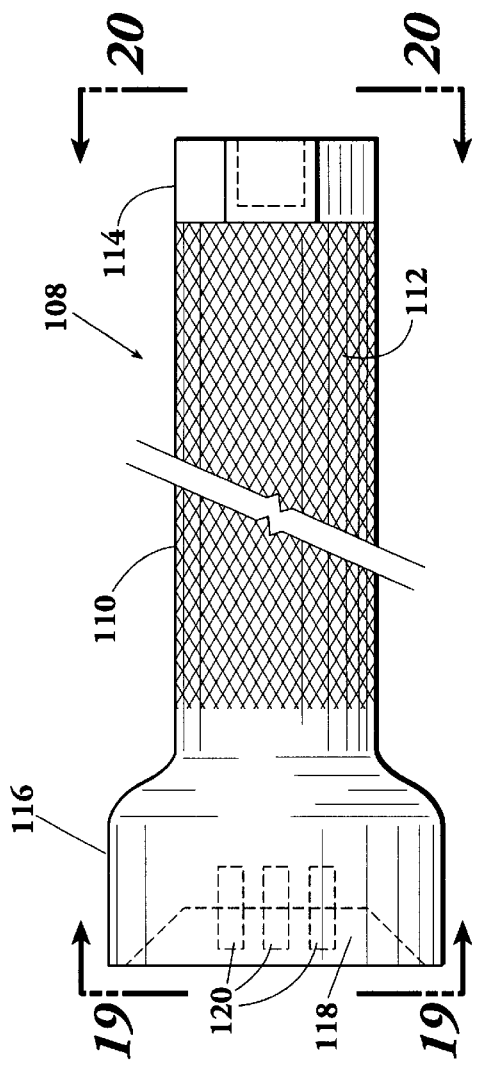
FIG. 18 is a side view of a setting tool for securing the bolt of FIG. 17 into the adhesive insert anchor of the present invention.

FIG. 18 shows setting tool 108 which includes a first end 116, shaft 110, and a second end 114. First end 116 has an indented portion 118 (shown in phantom). Indent 118 includes three prongs 120 which are press-fit into first end 116. Indent portion 118 and prongs 120 make tamper-proof head 106 and sockets 28 of screw member 14 (FIG. 17) so that when mated, setting tool 108 is used to thread, and remove, screw member 14 into/from anchor 10 (FIG. 1). Although tamper-proof head 106 and first end 116 of setting tool 108 are configured with three sockets 28 and three prongs 120 respectively, it is understood that the number and shape of mating sockets and prongs could vary substantially without departing from the spirit and scope of a tamper-proof arrangement.

Figure 19:
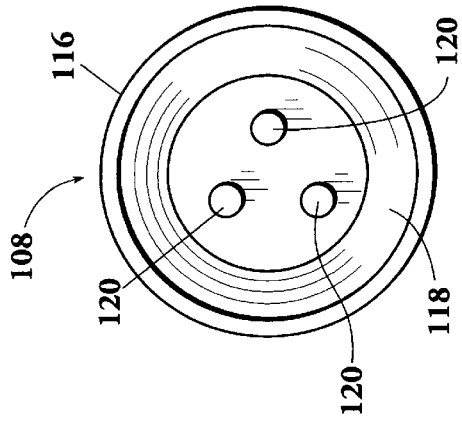
FIG. 19 is a first end view of the setting tool of FIG. 18.

FIG. 19, a view taken along line 19—19 of FIG. 18, depicts first end 116 of setting tool 108. Prongs 120 are shown recessed in indent 118 to receive tamper-proof head 106 of screw member 14 which includes mating sockets 28. Prongs 120 are constructed of rolled steel and press-fit into first end, however, it is understood that pins would be a suitable alternative.

Referring back to FIG. 18, shaft 110 of setting tool 108 is of a length so as to be gripped by a person's hand. Shaft 110 includes knurling 112 thereon so as to facilitate a person's grip.

Figure 20:
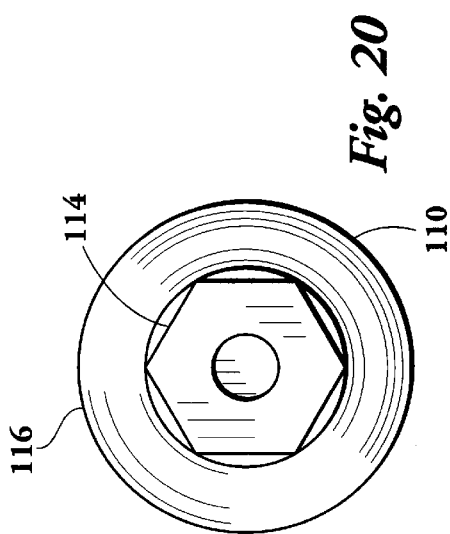
FIG. 20 is a second end view of the setting tool of FIG. 18.

Second end 114 of setting tool 108 includes an integral hex fitting to receive a socket, end, or crescent wrench so as to allow increased torque on setting tool 108 in order to thread or remove screw member 14. FIG. 20 is a view taken along line 20—20 of FIG. 18 showing second end 114 with integral hex fitting.

Figure 21:
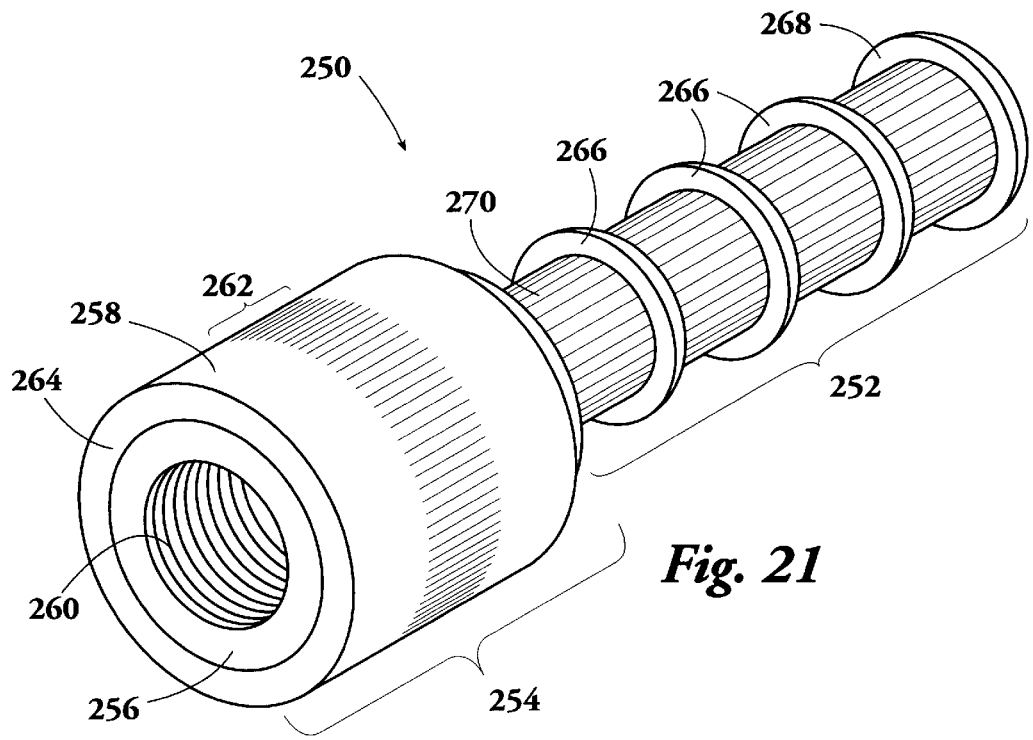
FIG. 21 is an isometric view of an alternate embodiment dielectric adhesive insert anchor including an insulator.

Referring next to FIG. 21, an alternate embodiment adhesive insert anchor 250. Anchor 250 includes an adhesion segment 252 and a friction segment 254. Anchor body 256 of anchor 250 is fitted with an insulator 258. Insulator 258 is constructed of material known to have electrical insulating properties. Materials known to be suitable electric insulators are suitable for insulator 258. Examples of suitable materials include nylon, polyvinyl chloride (PVC), and fiberglass tubing. However, many other suitable electrically non-conductive materials are commercially available.

Figure 22:
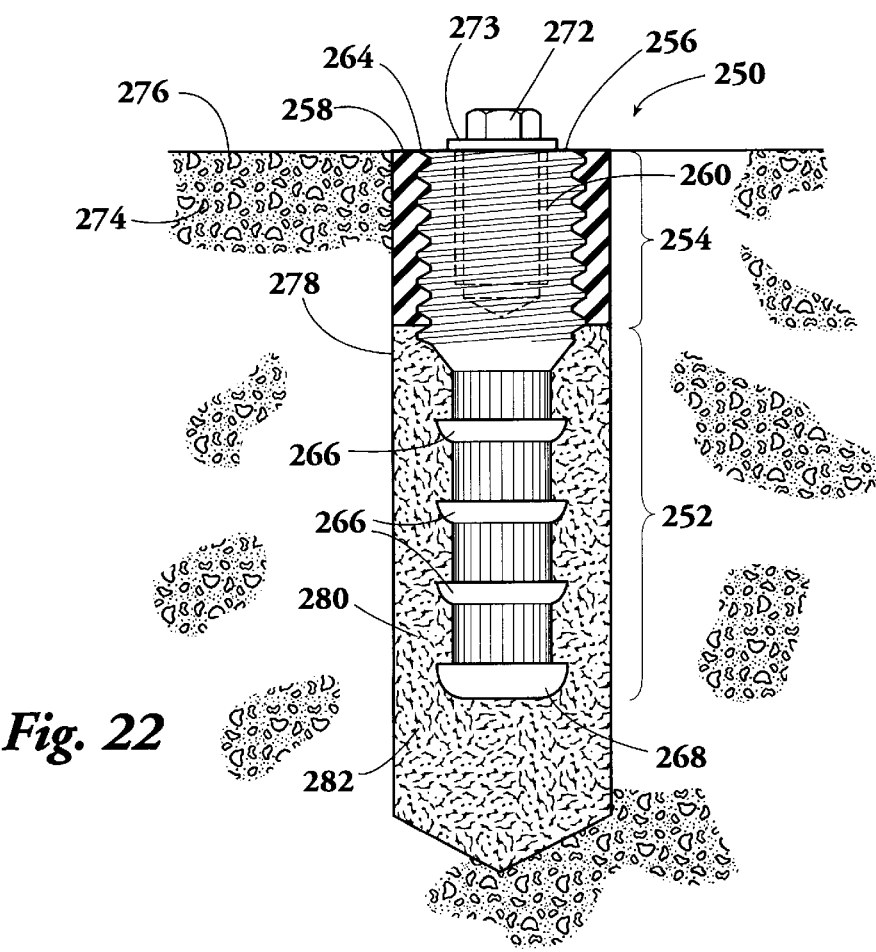
FIG. 22 is a cut-away side view of the dielectric adhesive insert anchor of FIG. 21 installed in a substrate.

Insulator 258, when fitted onto anchor body 256 forms friction segment 254 of anchor 250. Insulator 258 forming friction segment 254, as can be seen also in FIG. 22, is the portion of anchor 250 which contacts substrate 274. Insulator 258 being the friction segment 254 which contacts substrate 274 and being constructed of electrically non-conductive material electrically insulates anchor 250 from substrate 274. Adhesion segment 252 is spaced from substrate 274 by adhesive 280. Many adhesives presently used commercially, such as epoxy, are electrically non-conductive. Thereby, adhesion segment 252 is electrically insulated from substrate 274 by adhesive 280 wherein adhesive 280 completely fills the area 282 between adhesion segment 252 and the walls of hole 278 in substrate 274.

Anchor body 256 is a unitary piece of material extending from top surface 264 of friction segment 254 underneath insulator 258 and terminates with terminal button 268 of adhesion segment 252. Suitable materials for the construction of anchor body 256 include stainless or carbon steel, although other materials of similar tensile strength may be substituted.

Referring back to FIG. 21, anchor body 256 includes an internally threaded cavity 260 which extends substantially the entire length of friction segment 254. Internally threaded cavity 260 is threaded to receive a mating threaded bolt, such as bolt 272 of FIG. 22. Bolt 272 when threaded into internally threaded cavity 260 is used to fasten an object to anchor 250, and thereby substrate 274. Threaded bolt 272 could be replaced with a variety of head portion configurations such as those depicted in FIGS. 10–12. Anchor 250 could also be adapted with a tamper-proof system as described above. Internally threaded cavity 260 could also be eliminated and a variety of head portion configurations machined onto anchor body 256, such as a threaded rod, FIG. 12, or a permanent hold-down, FIG. 13, depending on the required application of anchor body 250.

The object to be fastened to anchor 250 may be spaced from the top surface 264 of friction segment 254 by an electrically non-conductive washer 273 so as to electrically insulate anchor body 256 from the object to be anchored. A second non-conductive washer may be installed on bolt 272 so as to electrically insulate bolt 272 from the object to be fastened to anchor 250. Electrically insulated washer 273 could be substituted with other electrically insulated spacers used in the industry as required for a particular anchor application.

Insulator 258 may include a knurled portion 262, FIG. 21, to supplement the friction fit between friction segment 254 and substrate 274. Knurled portion 262 resists the rotation of anchor body 256 within hole 278 when bolt 272 is threaded into internally threaded cavity 260 before adhesive 280 is cured.

Insulator 258 of friction segment 254 includes means for securing insulator 258 to anchor body 256. Referring to FIGS. 23–25, means for securing insulator 258 to anchor body 256 could include threading insulator 258 onto anchor body 256, as shown in FIG. 23, or press fitting insulator 258 onto anchor body 256, as shown in FIG. 25.

Referring to FIG. 23, anchor body 256 includes external threads 284 machined onto friction segment 254. Insulator 258 is internally threaded with threads 286. Threads 286 mate threads 284 so that insulator 258 may be threaded onto anchor body 256.

Threads 284 and 286 prevent epoxy from escaping between anchor body 256 and insulator 258 when anchor 250 is installed into a hole in a substrate containing epoxy (FIG. 22).

FIG. 24 is a top view of FIG. 23 which shows insulator 258 threaded onto anchor body 256 by threads 284 (shown in phantom). Insulator 258 is threaded onto anchor body 256 so that there is no gap, or space, between anchor body 256 and insulator 258 so as to prevent adhesive from escaping and possibly entering internally threaded cavity 260. Threads 261 of internally threaded cavity 260 are shown in phantom.

Referring to FIG. 25, means for fitting insulator 258 onto anchor body 256 may also include sliding insulator 258 onto anchor body 256, thereby eliminating threads 284 and 286 (of FIG. 23). The cost of machining threads onto anchor body 256 and into insulator 258 is thereby eliminated. It is desired, however, to obtain a tight fit between insulator 258 and anchor body 256 in order to prevent adhesive from escaping between insulator 258 and anchor body 256. Accordingly, it may be desirable to press fit insulator 258 onto anchor body 256. Additionally, if a resilient material such as nylon is used for insulator 258, insulator 258 may be heated prior to being press fit onto anchor body 256 so as to obtain a secure bond between anchor body 256 and insulator 258.

Referring back to FIGS. 21 and 22, adhesion segment 252 is identical to adhesion segment 16 described above. Adhesion segment 252 includes a plurality of buttons 266 and terminates with a terminal button 268. Button 268 forms the terminal end of anchor 250.

Shaft 270 of adhesion segment 252 includes knurling thereon in the portions of shaft 270 between buttons 266. This knurling increases the surface area of shaft 270. When adhesion segment 252 is inserted into a hole containing adhesive, the adhesive enters the crevices formed by the knurling and thereby forms a surface-to-surface bond between shaft 270 and the adhesive. These surface-to-surface bonds increase the holding value of anchor 250. As discussed above, the knurling could be in many suitable configurations.

Installation of anchor 250 of FIG. 22 is substantially the same as installation of anchor 10 as described above in FIGS. 4–9 and begins with drilling hole 278 in substrate 274 to a predetermined depth. The depth of hole 278 is grater than the length of anchor 250 to accommodate a generous amount of adhesive. Hole 278 is then cleaned with compressed air and a brush to remove any loose material in hole 278 as a result of drilling. After hole 278 is cleaned, adhesive is added to hole 278. The proper amount of adhesive should be added to hole 278 so that when anchor 250 is inserted into hole 278, the adhesive, or epoxy, fills the entire area 282 between adhesion segment 252 of anchor 250 and the walls of hole 278. If adhesive 280 is non-conductive, such as epoxy, adhesive segment 252 is electrically insulated from substrate 274.

Once the proper amount of adhesive is added, anchor 250 is twisted into hole 278 until friction segment 254 contacts hole 278. Twisting anchor 250 agitates and displaces adhesive 280 in hole 278. Anchor 250 is driven into hole 278 so that the top surface 264 of friction segment 254 is flush with the surface 276 of substrate 274. Adhesive fills the entire area 282 between adhesion segment 252 and hole 278. The friction fit between friction segment 254 of anchor 250 and the walls of the substrate hole 278 maintain adhesion segment 252 a predetermined distance above the bottom of hole 278. Additionally, the friction fit provides light-duty interim loading until the adhesive cures around the adhesion segment 252.

Since insulator 258 contacts substrate 274 and not anchor body 256, anchor body 256 is electrically insulated from substrate 274. Insulator 258 maintains the friction fit between anchor 250 and substrate 274 as well as electrically insulates anchor 250 from substrate 274.

After anchor 250 is installed in hole 278, an object to be fastened to anchor 250, such as a railroad tie, may be placed over hole 278. Bolt 272 is inserted through the railroad tie and threaded into internal cavity 260 of anchor 250. The railroad tie is now anchored to substrate 274. Insulated washer(s) 273 electrically insulate anchor 250 from the railroad tie, as discussed above. Bolt 272 can be threaded into cavity 260 while adhesive 280 is curing around adhesion segment 252 due to the interim loading capability of anchor 250. Knurled portion 262 of insulator 258 on friction segment 254 resists rotation of anchor 250 while bolt 272 is tightened in cavity 260. Quick installation due to coactive holding capability is thereby provided by anchor 250.

Dielectric adhesive insert anchor 250 may be used to replace cast-in-place anchors which pull out of the substrate. First, a dielectric adhesive insert anchor 250 is obtained with a friction segment 254 having a larger outer diameter than the hole in the substrate where the cast-in-place anchor was removed. The hole in the substrate is then drilled to the larger diameter of dielectric adhesive insert anchor 250. The hole is then cleaned and dielectric adhesive insert anchor 250 is installed using the procedure discussed above.

Anchor 250 of FIG. 22 could also be modified for overhead applications through the addition of a sleeve (not shown) around adhesion segment 252. Installation of anchor 250 in overhead applications would be substantially the same as shown in FIGS. 14, 15, and 16, and the description relating thereto. The sleeve would be modified from that shown in FIGS. 14, 15, and 16, however, to accommodate for the length and diameter of adhesion segment 252 of anchor 250.

Three dielectric adhesive insert anchors constructed as described herein with insulator 258 threaded onto anchor body 256 were installed in concrete as described above with epoxy as the adhesive. After the epoxy had been allowed to cure (approximately 72 hours), the anchors were pulled from the concrete. The holding values of the three test anchors were:

1.) 42,000 lbs.
2.) 45,500 lbs.
3.) 45,500 lbs.

with the average being 44,333 lbs.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A dielectric adhesive insert anchor, comprising:
   an anchor body having a first end and an terminal end;
   said anchor body including an integral adhesion segment adjacent said terminal end;
   said adhesive segment including a longitudinal shaft with a plurality of buttons positioned along its length;
   said shaft having an outer diameter and said buttons each having an outer diameter wherein the outer diameter of each button is greater than the outer diameter of said shaft;
   a cylindrical friction segment having a substantially uniform and cylindrical an outer diameter;
   said friction segment being secured to said anchor body on said first end;
   said friction segment being constructed of a material which is electrically non-conductive;
   said outer diameter of said friction segment being greater than said outer diameter of each of said buttons.

2. The dielectric adhesive insert anchor of claim 1 wherein said friction segment is constructed of a material selected from the group including nylon, polyvinyl chloride, and fiberglass.

3. The dielectric adhesive insert anchor of claim 1 wherein said friction segment is constructed of nylon.

4. The dielectric adhesive insert anchor of claim 1 wherein the friction segment includes a threaded inner circumference and said first end of said anchor body includes a threaded circumference such that the threads on said inner circumference of said friction segment mate the threads on said circumference of said first end of said anchor body so that said friction segment is capable of being screwed onto said first end of said anchor body.

5. The dielectric adhesive insert anchor of claim 1 wherein said friction segment is press fit onto said first end of said anchor body.

6. The dielectric adhesive insert anchor of claim 1 wherein said first end of said anchor body includes an internally threaded cavity therein.

7. The dielectric adhesive insert anchor of claim 6 further including a screw threaded into said internally threaded cavity.

8. The dielectric adhesive insert anchor of claim 1 wherein said terminal end of said anchor body is defined by a terminal button on said adhesive segment.

9. The dielectric adhesive insert anchor of claim 8 wherein each said button is formed integrally with said shaft and is saucer shaped defined by a rounded portion facing said terminal end of said anchor body and a flat shelf facing said friction segment.

10. The dielectric adhesive insert anchor of claim 1 wherein said friction segment contains knurling thereon.

11. The dielectric adhesive insert anchor of claim 1 wherein said shaft is knurled along its length between each said button.

12. A dielectric adhesive insert anchor for retaining an object against a substrate, said adhesive insert anchor being inserted within a hole defined in said substrate, said hole having a bottom and a diameter, comprising:
    an anchor body including a cylindrical first end having an outer circumference and a terminal end;
    said anchor body including an adhesion segment adjacent said terminal end;
    said adhesion segment having an outer diameter;
    a friction segment having a length and an outer diameter secured over said outer circumference of said first end of said anchor body wherein said outer diameter of said friction segment is greater than said outer diameter of said adhesion segment;
    said first end of said anchor body extending substantially the entire length of said friction segment;
    said friction segment being constructed of a material which is electrically non-conductive;
    whereby when said dielectric adhesive insert anchor is inserted within the hole, said friction segment friction fits against the substrate thereby securing said anchor body in the hole and suspending said terminal end at a predetermined distance above the bottom of the hole.

13. The dielectric adhesive insert anchor of claim 12 wherein said friction segment is constructed of a material selected from the group including nylon, polyvinyl chloride, and fiberglass.

14. The dielectric adhesive insert anchor of claim 12 wherein said adhesion segment includes:
    a shaft;
    at least one button positioned on said shaft.

15. The dielectric adhesive insert anchor of claim 14 wherein said terminal end of said anchor body includes a rounded terminal button on said adhesion segment.

16. The dielectric adhesive insert anchor of claim 12 wherein said anchor body includes an internally threaded cavity extending from said first end thereof.

17. The dielectric adhesive insert anchor of claim 16 further including a bolt threaded into said internally threaded cavity.

18. A dielectric adhesive insert anchor for retaining an object against a substrate, said dielectric adhesive insert anchor being inserted within a hole defined in said substrate, said hole having a bottom and a diameter, comprising:
    an anchor body including a first end having a top surface, a length, and an outer diameter;

said anchor body including an adhesion segment adjacent said first end;

said adhesion segment having an outer diameter and a terminal end;

an insulator having a top surface and being substantially the same length as said first end of said anchor body;

said insulator being secured to said anchor body on said first end to form a friction segment wherein said top surface of said insulator is flush with said top surface of said anchor body;

said friction segment having an outer diameter greater than said outer diameter of said adhesion segment;

said insulator being constructed of a material which is electrically non-conductive.

19. The dielectric adhesive insert anchor of claim 18 wherein said insulator is constructed of a material selected from the group including nylon, polyvinyl chloride, and fiberglass.

20. The dielectric adhesive insert anchor of claim 18 wherein said adhesion segment includes:

a shaft;

at least one button positioned on said shaft.

21. The dielectric adhesive insert anchor of claim 20 wherein said terminal end of said adhesion segment includes a rounded terminal button.

22. The dielectric adhesive insert anchor of claim 18 wherein said anchor body includes an internally threaded cavity extending from said top surface of said first end.

23. The dielectric adhesive insert anchor of claim 22 further including a bolt threaded into said internally threaded cavity.

* * * * *